US006108592A

United States Patent [19]

Kurtzberg et al.

[11] Patent Number: 6,108,592

[45] Date of Patent: Aug. 22, 2000

[54] VOICE-CONTROLLED MOTORIZED WHEELCHAIR WITH SENSORS AND DISPLAYS

[75] Inventors: Jerome M. Kurtzberg, Yorktown Heights; John Stephen Lew, Ossining, both of N.Y.

[73] Assignee: International Business Machines Corporation, Armonk, N.Y.

[21] Appl. No.: 09/074,617

[22] Filed: May 7, 1998

[51] Int. Cl.[7] ................................ G05D 1/00; G06F 7/00

[52] U.S. Cl. ................................ 701/1; 701/23; 180/6.5; 180/65.1; 180/907; 180/167; 180/169; 280/250.1; 280/755; 318/269; 318/369

[58] Field of Search .................................... 701/1, 23, 24, 701/28; 280/250.1, 755; 307/116, 117; 180/907, 6.5, 169, 65.1, 167; 704/270, 225, 233, 239, 240, 251, 256; 318/269, 369, 55; 340/825.19, 825.56, 825.69

[56] References Cited

U.S. PATENT DOCUMENTS

| | | | |
|---|---|---|---|
| 4,207,959 | 6/1980 | Youdin et al. | 180/167 |
| 4,260,035 | 4/1981 | Loveless et al. | 180/6.5 |
| 4,767,940 | 8/1988 | Tuttle | 307/116 |
| 5,363,933 | 11/1994 | Yu et al. | 180/6.5 |
| 5,497,056 | 3/1996 | Kurland et al. | 318/269 |
| 5,523,745 | 6/1996 | Fortune et al. | 340/825.19 |
| 5,555,495 | 9/1996 | Bell et al. | 700/38 |
| 5,774,841 | 6/1998 | Salazar et al. | 704/225 |
| 5,812,978 | 9/1998 | Nolan | 704/275 |
| 5,964,473 | 10/1999 | Degonda et al. | 280/250.1 |

*Primary Examiner*—Jacques H. Louis-Jacques
*Attorney, Agent, or Firm*—Whitham, Curtis, Whitham; Stephen C. Kaufman, Esq.

[57] ABSTRACT

A motorized wheel-chair is equipped with one or more sensors for detecting obstacles. The detection method may be either radar or sonar (or both). An on-board computer processes these echoes and presents a visual or auditory display. With the benefit of these displays, the user issues voice commands (or exerts manual pressure) to maneuver appropriately the motorized wheelchair. One or more microphones pick up the sounds of the user's voice and transmit them to a computer. The computer decodes the maneuvering commands by speech-recognition techniques and transmits these commands to the wheelchair to effect the desired motion. In addition to speech recognition for decoding commands, voice (speaker) recognition is employed to determine authorized users.

7 Claims, 3 Drawing Sheets

VOICE-CONTROLLED MOTORIZED WHEELCHAIR WITH SENSORS AND DISPLAYS

BACKGROUND OF THE INVENTION

1. Field of the Invention

The present invention generally relates to motorized wheelchairs and, more particularly, to a voice controlled motorized wheelchair equipped with sensors for detection of obstacles, and with auditory and visual displays for the wheelchair user.

2. Background Description

Many people with severely limited mobility, and with auditory and/or visual deficits, are forced to use wheelchairs. For such people, motorized wheelchairs can be provided, but such wheelchairs lack sensors for detecting obstacles, voice-control for maneuvering operations, and displays to direct such operations. Also, they lack the benefit of sophisticated computer processing for enhancing such operations.

SUMMARY OF THE INVENTION

It is therefore an object of the present invention to provide a wheelchair for people with severely limited mobility and with auditory and/or visual defects.

According to the invention, there is provided means for physically disabled people-those with limited mobility and sensory deficits-to use a motorized wheelchair more effectively. The motorized wheel-chair is equipped with one or more sensors for detecting obstacles. The detection method may be either radar or sonar (or both). That is, either radio waves or sound waves (or both) are emitted and echoes monitored. An on-board computer processes these echoes and presents a visual or auditory display. With the benefit of these displays, the user issues voice commands (or exerts manual pressure) to maneuver appropriately the motorized wheelchair.

One or more microphones pick up the sounds of the user's voice and transmit them to the computer. The computer decodes the maneuvering commands by speech-recognition techniques and transmits these commands to the wheelchair to effect the desired motion. The set of maneuvering commands is limited; e.g., turn right, turn left, stop, back up, slow down, etc. In addition to speech recognition for decoding commands, voice (speaker) recognition is employed to determine authorized users.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
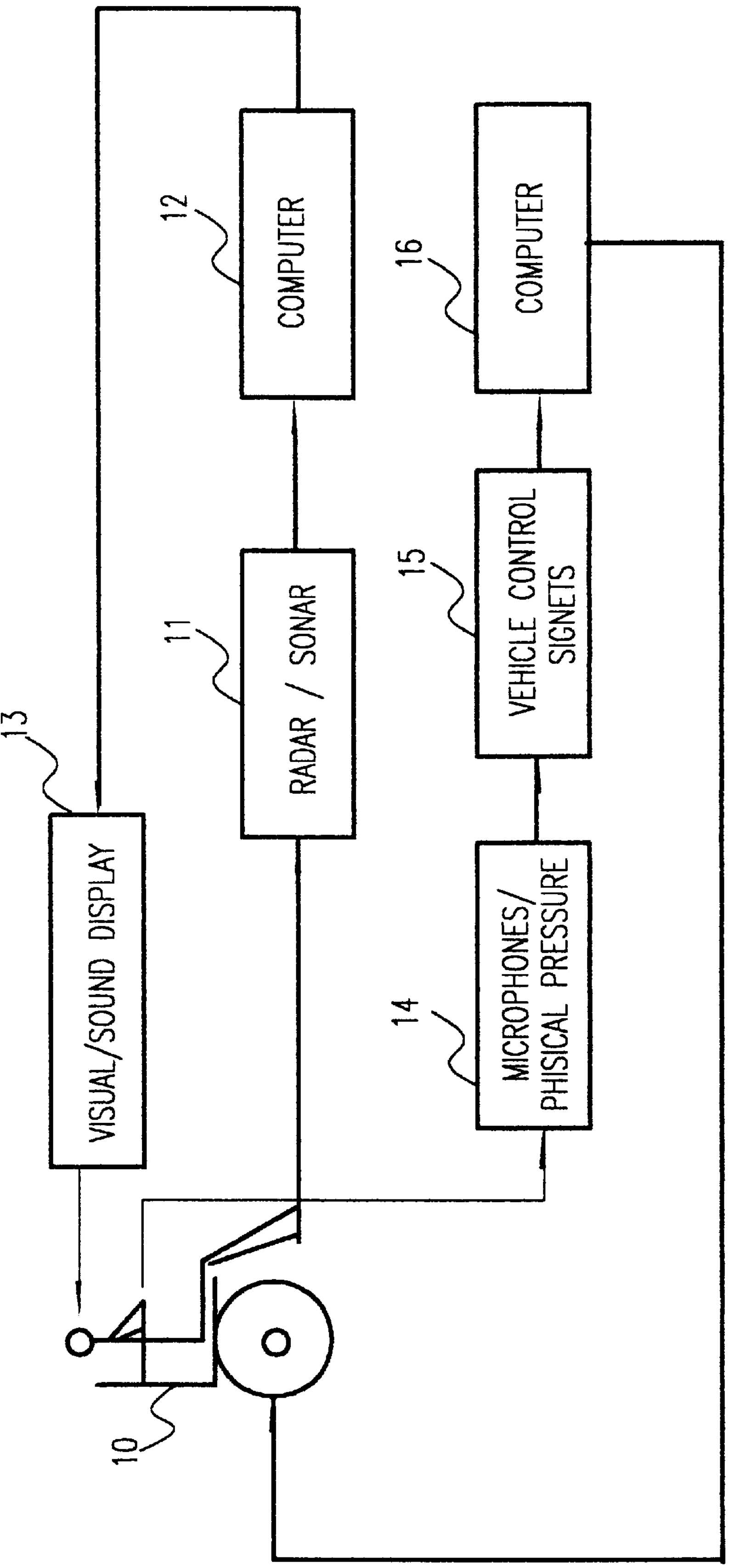
FIG. 1 is a block diagram showing the overall configuration of a preferred embodiment of the invention.
Figure 2:
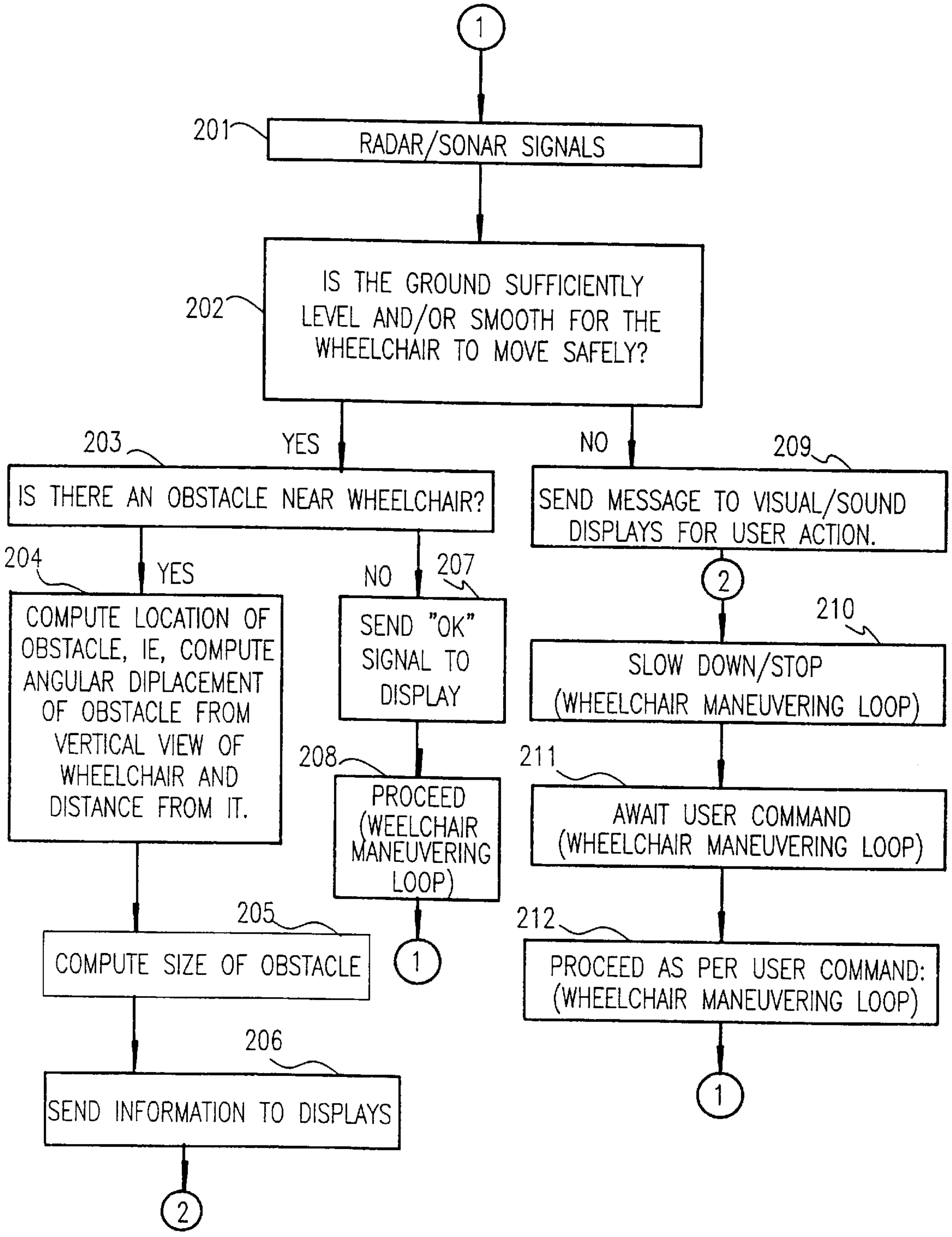
FIG. 2 is a flow diagram for the visual and sound displays illustrating the display processing for the occupant of the wheelchair.
Figure 3:
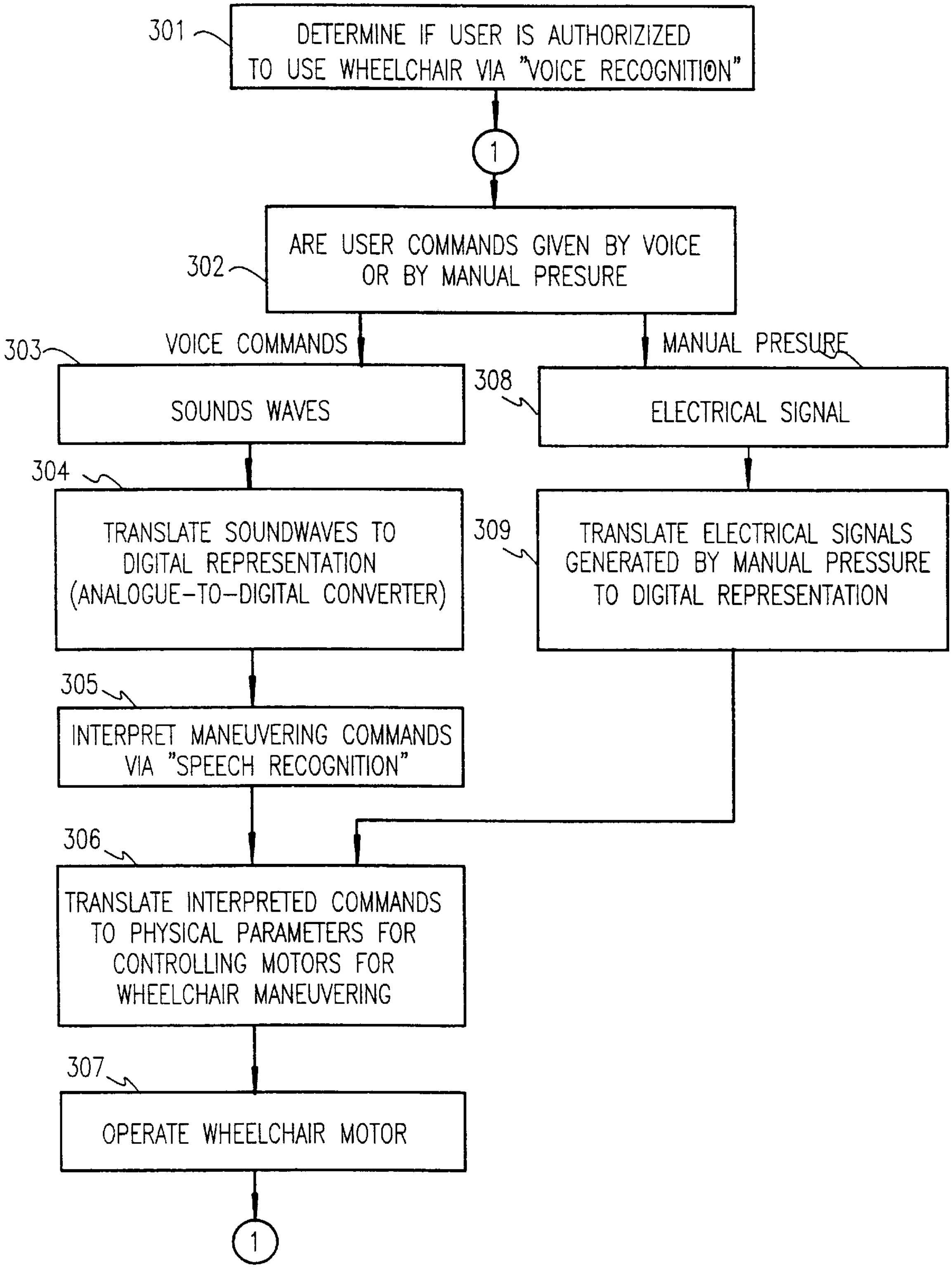
FIG. 3 is a flow diagram showing the processing for controlling the motion of the wheelchair so that the wheelchair can be maneuvered in response to the user's commands communicated either orally or by manual pressure.

Referring now to the drawings FIGS. 1, 2 and 3, and more particularly to FIG. 1, there is shown a block diagram of the configuration of a preferred embodiment of the invention. A wheelchair 10 is provided with one or more sensors 11 for detecting obstacles. The detection method may be either radar or sonar (or both). That is, either radio waves or sound waves (or both) are emitted and echoes monitored. Such sensors are well known in the art. Radar sensors, for example, are currently being tested for use in automobiles for collision avoidance systems, and sonar sensors, for example, have for some time been used in some types of autofocus cameras.

An on-board computer 12 processes these echoes and generates an output to a visual and/or auditory display 13 (described in more detail with reference to FIG. 2). The visual display might, for example, provide the user with a display to the rear or in peripheral areas not easily viewed by the user. The auditory display might, for example, be a combination of alarm to avoid collision and computer generated voice warnings and instructions for maneuvering the wheelchair. The specific visual and/or auditory displays can be customized for the particular user and the user's disabilities. With the benefit of these displays, the user issues voice commands (or exerts manual pressure) to maneuver appropriately the motorized wheelchair.

One or more microphones 14 pick up the sounds of the user's voice, which specifies commands for wheelchair maneuvering. These voice commands, in the form of sound waves, are translated to a digital representation via an analog-to-digital converter 15. These digitized control signals for wheelchair maneuvering are transmitted to a computer 16. The computer 16 may be a separate computer from computer 12, or the two computers may be combined into a single computer with appropriate software. Since these computers are dedicated, limited use embedded computers of the type now commonly used in automotive and appliance applications are preferred.

The computer 16 decodes the maneuvering commands by speech-recognition techniques and transmits these commands to the wheelchair 10 to effect the desired motion. The set of maneuvering commands is limited; e.g., turn right, turn left, stop, back up, slow down, etc. Speech-recognition techniques are now well known in the art. See, for example, A. J. Rubio Ayuso and J. M. Lopez Soler (Eds.), *Speech Recognition and Coding,* Springer Verlag, Berlin 1995; and Eric Keller (Ed.), *Fundamentals of Speech Synthesis and Speech Recognition,* John Wiley & Sons, New York 1994. In addition to speech recognition for decoding commands, voice (speaker) recognition is employed to determine authorized users. Speech recognition determines the meaning of given words, whereas voice (speaker) recognition determines the identity of the speaker, not their meaning. Voice recognition is also well known in the art. See, for example, N. R. Dixon and T. B. Martin (Eds.), *Automatic Speech & Speaker Recognition,* IEEE Press, New York 1979; and M. R. Schroeder (Ed.), *Speech and Speaker Recognition,* Karger, New York 1985.

Referring now to FIG. 2, the processing flow for the visual and sound displays will now be described in more detail. Radar or sonar signals (or both) are input at input block 201, and test is made in decision block 202 to determine if the ground is sufficiently level and/or smooth for the wheelchair to move safely. If so, a test is next made in decision block 203 to determine if there is an obstacle near the wheelchair. If so, the location of the obstacle is computed in function block 204. This computation is preferably in radial coordinates; i.e., an angular displacement and radial distance from the wheelchair. Next, the size of the obstacle is computed in function block 205. The location and size of the obstacle are then sent to information displays (visual and/or sound) in function block 206. The visual display may show the position and size of the obstacle with respect to the wheelchair, while the auditory display may be a voice warning with instructions for avoiding the obstacle. At this point, the process goes to function block 210 described in more detail below.

Returning to decision block 203, if there is no obstacle near the wheelchair, then an "OK" signal is sent to the display in function block 207. The wheelchair then proceeds in its maneuvering loop (FIG. 3), here represented by function block 208. A return is then made to beginning of the display loop to receive radar or sonar signals (or both).

If the test in decision block 202 is negative indicating that the wheelchair cannot move safely, then a message is sent to the visual and/or sound displays for user action in function block 209. The wheelchair is slowed down or stopped in function block 210, and a user command is awaited in function block 211. Finally, the wheelchair proceeds as per the received user command in function block 212 before a return is made to the beginning of the display loop to again receive radar and/or sonar signals. The process flow of function blocks 210, 211 and 212 are not, strictly speaking, part of the visual and/or sound display processing but, more accurately, part of the wheelchair maneuvering processing shown in FIG. 3. However, the display processing is subordinated to the wheelchair maneuvering processing when either the ground is determined to be too inclined or rough for safe moving or an obstacle is detected.

Referring next to FIG. 3, the processing for the wheelchair maneuvering will now be described in more detail. The process begins with a security routine in block 301. Preferably this is a determination based on voice recognition as to whether or not the user of the wheelchair is authorized to use the wheelchair. Assuming authorization is granted, a test is made in decision block 302 to determine if the user commands are given by voice or by manual pressure. If by voice commands, sound waves are input in input block 203, and these sound waves are translated to digital representations, using analog-to-digital converter 14 in FIG. 1, in function block 304. The digitized maneuvering commands are interpreted in function block 305 using speech recognition. The interpreted commands are then translated to physical parameters for controlling motors for wheelchair maneuvering in function block 306. In response, the wheelchair motors are operated in function block 307 before a return is made to function block 302.

If the user commands are given by manual pressure as determined in decision block 302, then the input manual pressures are converted to electrical signals, using strain gauges or the like, in function block 308. The converted electrical signals are translated to digital representations in function block 309, and the digital representations are input to function block 306.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A motorized wheelchair for a user with severely limited mobility and with auditory and/or visual deficits comprising:

sensing means mounted on the wheelchair for detecting obstacles and generating an output signal indicating a distance, a size and a direction of a detected obstacle;

a first computer responsive to the output signal of the sensing means for processing the signal to generate visual and auditory displays;

a visual and auditory display device responsive to the first computer for providing the user with a warning, the distance size, and direction of an obstacle;

a microphone mounted on the wheelchair for generating signals in response to the user's voice commands based on signals from the visual and auditory display device; and a second computer responsive to the microphone generated signals for processing the signals using a speech recognition program, the second computer generating output control signals to the wheelchair in response to recognized commands from the user.

2. The motorized wheelchair recited in claim 1 wherein the second computer further processes the signals from the microphone using a voice recognition program to identify the user of the wheelchair.

3. The motorized wheelchair recited in claim 1 wherein the sensing means comprise a radar sensor.

4. The motorized wheelchair recited in claim 1 wherein the sensing means comprise a sonar sensor.

5. The motorized wheelchair recited in claim 1 wherein the sensing means comprise radar and sonar sensors.

6. The motorized wheelchair recited in claim 1 wherein the first and second computers are a single computer.

7. The motorized wheelchair recited in claim 1 further comprising pressure responsive means responsive to a user's manual pressure for wheelchair control for generating signals to the second computer.

* * * * *